United States Patent
Kim et al.

(10) Patent No.: US 9,257,852 B2
(45) Date of Patent: Feb. 9, 2016

(54) BATTERY PACK AND METHOD OF CONTROLLING THE SAME

(71) Applicant: SAMSUNG SDI CO., LTD., Yongin-si, Gyeonggi-do (KR)

(72) Inventors: Jin-Wan Kim, Yongin-si (KR); Susumu Segawa, Yongin-si (KR); Se-Sub Sim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 421 days.

(21) Appl. No.: 13/734,158

(22) Filed: Jan. 4, 2013

(65) Prior Publication Data

US 2014/0055095 A1 Feb. 27, 2014

(30) Foreign Application Priority Data

Aug. 21, 2012 (KR) .................. 10-2012-0091470

(51) Int. Cl.
*H02J 7/00* (2006.01)

(52) U.S. Cl.
CPC ............ *H02J 7/0029* (2013.01); *H02J 7/0031* (2013.01); *H02J 2007/004* (2013.01); *H02J 2007/0037* (2013.01); *H02J 2007/0098* (2013.01)

(58) Field of Classification Search
CPC ........................................................ H02J 7/04
USPC .................... 320/134, 135, 136; 361/90, 91.1
See application file for complete search history.

(56) References Cited

U.S. PATENT DOCUMENTS

| | | | |
|---|---|---|---|
| 6,082,115 A * | 7/2000 | Strnad | 62/3.7 |
| 2010/0194346 A1* | 8/2010 | Lee et al. | 320/134 |
| 2010/0302050 A1 | 12/2010 | Kang et al. | |
| 2011/0121789 A1* | 5/2011 | Yang et al. | 320/152 |
| 2013/0221924 A1* | 8/2013 | Sim et al. | 320/112 |

FOREIGN PATENT DOCUMENTS

| | | |
|---|---|---|
| JP | 2009-118591 A | 5/2009 |
| KR | 10-2010-0090198 A | 8/2010 |
| KR | 10-2010-0128586 A | 12/2010 |
| KR | 10-2011-0056118 A | 5/2011 |

* cited by examiner

*Primary Examiner* — Drew A Dunn
*Assistant Examiner* — Harry O'Neill-Becerril
(74) *Attorney, Agent, or Firm* — Lee & Morse, P.C.

(57) ABSTRACT

A battery pack includes at least one battery cell, a microcomputer having a first voltage measuring terminal, a second voltage measuring terminal, and a reference voltage output terminal, the microcomputer being configured to control recharge and discharge of the at least one battery cell by detecting an abnormality of a reference voltage at the reference voltage output terminal in accordance with first and second voltages at respective first and second voltage measuring terminals, a voltage distribution unit connected between the reference voltage output terminal and a ground, the voltage distribution unit being configured to distribute voltage and to output to the microcomputer a medium voltage as the first voltage, and a voltage measuring unit connected between the reference voltage output terminal and the ground, the voltage measuring unit being configured to output to the microcomputer a forwarding direction voltage of a diode as the second voltage.

15 Claims, 4 Drawing Sheets

| Vref | | SECOND VOLTAGE | FIRST VOLTAGE |
|---|---|---|---|
| 1.5V<br>(NORMAL STATE) | volt | 0.6 | 0.75 |
| | AD | 2450 | 500 |
| | Temp. | 20deg | 20deg |
| 2.0V<br>(ABNORMAL STATE) | volt | 0.6 | 1.0 |
| | AD | 2200 | 500 |
| | Temp. | 40deg | 20deg |

FIG. 5

BATTERY PACK AND METHOD OF CONTROLLING THE SAME

CROSS-REFERENCE TO RELATED APPLICATION

The present application claims priority under 35 U.S.C. §119 to Korean Patent Application No. 10-2012-0091470, filed on Aug. 21, 2012, in the Korean Intellectual Property Office, and entitled: "Battery Pack and Method of Controlling the Same," which is incorporated by reference herein in its entirety.

BACKGROUND

1. Field

One or more embodiments relate to battery packs that perform a protective operation by determining whether the battery packs are normal or not and methods of controlling the same.

2. Description of the Related Art

Generally, with the development of portable electronic devices, e.g., cellular phones and personal digital assistants (PDAs), studies about rechargeable secondary batteries have been actively performed. In particular, various kinds of rechargeable secondary batteries, e.g., a nickel metal hybrid battery (NiMH), a lithium ion battery, a lithium polymer battery, a metal lithium battery, and an air zinc battery, have been developed. The rechargeable secondary battery includes a battery pack with a circuit, and charges and discharges are performed through external terminals of the battery pack.

A conventional battery pack may include battery cells and a peripheral circuit having a rechargeable circuit. The peripheral circuit may be combined with the battery cells, after the peripheral circuit is formed as a printed circuit substrate. When the battery pack is connected to an external power through the external terminals of the battery pack, the battery cells are charged by the external power supplied through the external terminals and the rechargeable circuit, and when a load is applied to the battery pack through the external terminals, the power of the battery cells is supplied to the load through the rechargeable circuit and the external terminals. At this point, the rechargeable circuit of the peripheral circuit controls the recharge and discharge of the battery cells connected to the external terminals. Generally, a plurality of battery cells is connected in parallel or in series.

SUMMARY

One or more embodiments include a battery pack that does not allow recharging or discharging when safety and functional problems occur in the battery pack, and a method of controlling the battery pack.

Additional aspects will be set forth in part in the description which follows and, in part, will be apparent from the description, or may be learned by practice of the presented embodiments.

According to one or more embodiments, there is provided a battery pack including at least one battery cell, a microcomputer with a first voltage measuring terminal, a second voltage measuring terminal, and a reference voltage output terminal, the microcomputer being configured to control recharge and discharge of the at least one battery cell by detecting an abnormality of a reference voltage at the reference voltage output terminal in accordance with first and second voltages at respective first and second voltage measuring terminals, a voltage distribution unit connected between the reference voltage output terminal and a ground, the voltage distribution unit being configured to distribute voltage and to output to the microcomputer a medium voltage as the first voltage, and a voltage measuring unit connected between the reference voltage output terminal and the ground, the voltage measuring unit being configured to output to the microcomputer a forwarding direction voltage of a diode as the second voltage.

The microcomputer may be configured to determine the reference voltage as abnormal, when a variation rate of the second voltage exceeds a critical value at a constant state of the first voltage.

The microcomputer may be configured to stop recharging or discharging the battery cell when the reference voltage is detected as abnormal.

The microcomputer may further include an analog-to-digital converter (ADC) configured to convert voltage values of the first and second voltages measured at the first voltage measuring terminal and the second voltage measuring terminal, respectively, to digital values according to a resolution set in advance, and a detection unit configured to determine whether the reference voltage is abnormal or not according to the converted digital values of the first voltage and the second voltage.

The voltage distribution unit may include a first device having first and second ends, the first end of the first device being connected to the reference voltage output terminal, and a second device having first and second ends, the first end of the second device being connected to a node between the second end of the first device and the first voltage measuring terminal, and the second end of the second device being connected to the ground.

The first device or the second device may be a temperature sensitive resistor.

The first device or the second device may be a thermistor.

The voltage measuring unit may include a third device having first and second ends, the first end of the third device being connected to the reference voltage output terminal, and a diode having first and second ends, a first end of the diode being connected to a node between the second end of the third device and the second voltage measuring terminal, and the second end of the diode being connected to the ground.

According to one or more embodiments, there is also provided a method of controlling a battery pack having at least one battery cell and a microcomputer with a reference voltage output terminal, a first voltage measuring terminal, and a second voltage measuring terminal, the method including distributing voltage by a voltage distribution unit, such that a medium voltage is received by the microcomputer as a first voltage through the first voltage measuring terminal, the voltage distribution unit being connected between the reference voltage output terminal and a ground, receiving from a voltage measuring unit a forwarding direction voltage as a second voltage through the second voltage measuring terminal of the microcomputer, the voltage measuring unit being connected between the reference voltage output terminal and the ground, detecting whether a reference voltage at the reference voltage output terminal of the microcomputer is abnormal or not in accordance with the first and second voltages at respective first and second voltage measuring terminals, and controlling recharge and discharge of the at least one battery cell in accordance with the detection result regarding the abnormality of the reference voltage.

Detecting whether the reference voltage may be abnormal or not includes detecting the reference voltage as abnormal when a variation rate of the second voltage exceeds a critical value at a constant state of the first voltage.

The method may include stopping recharging or discharging the at least one battery cell when the reference voltage is detected as abnormal.

Receiving the medium voltage as the first voltage may include receiving voltage as a result of distributing the reference voltage according to a measured temperature as the first voltage, after measuring the temperature of the battery cell or the microcomputer by using a predetermined device, the predetermined device having a resistance that varies according to temperature.

Receiving the second voltage may include receiving the forwarding direction voltage from a diode in the voltage measuring unit as the second voltage, a voltage of the diode varying according to temperature.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer, i.e., an element, is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
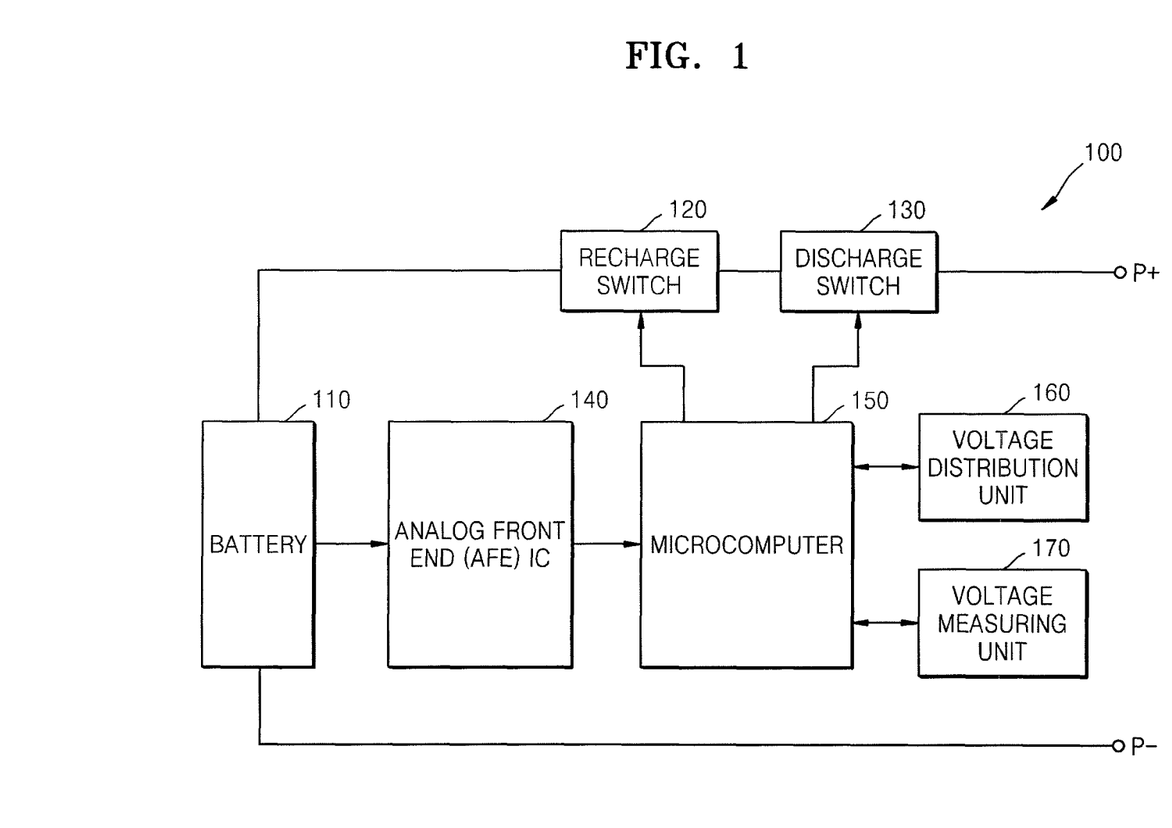
FIG. 1 illustrates a configuration of a battery pack according to an embodiment.
Figure 2:
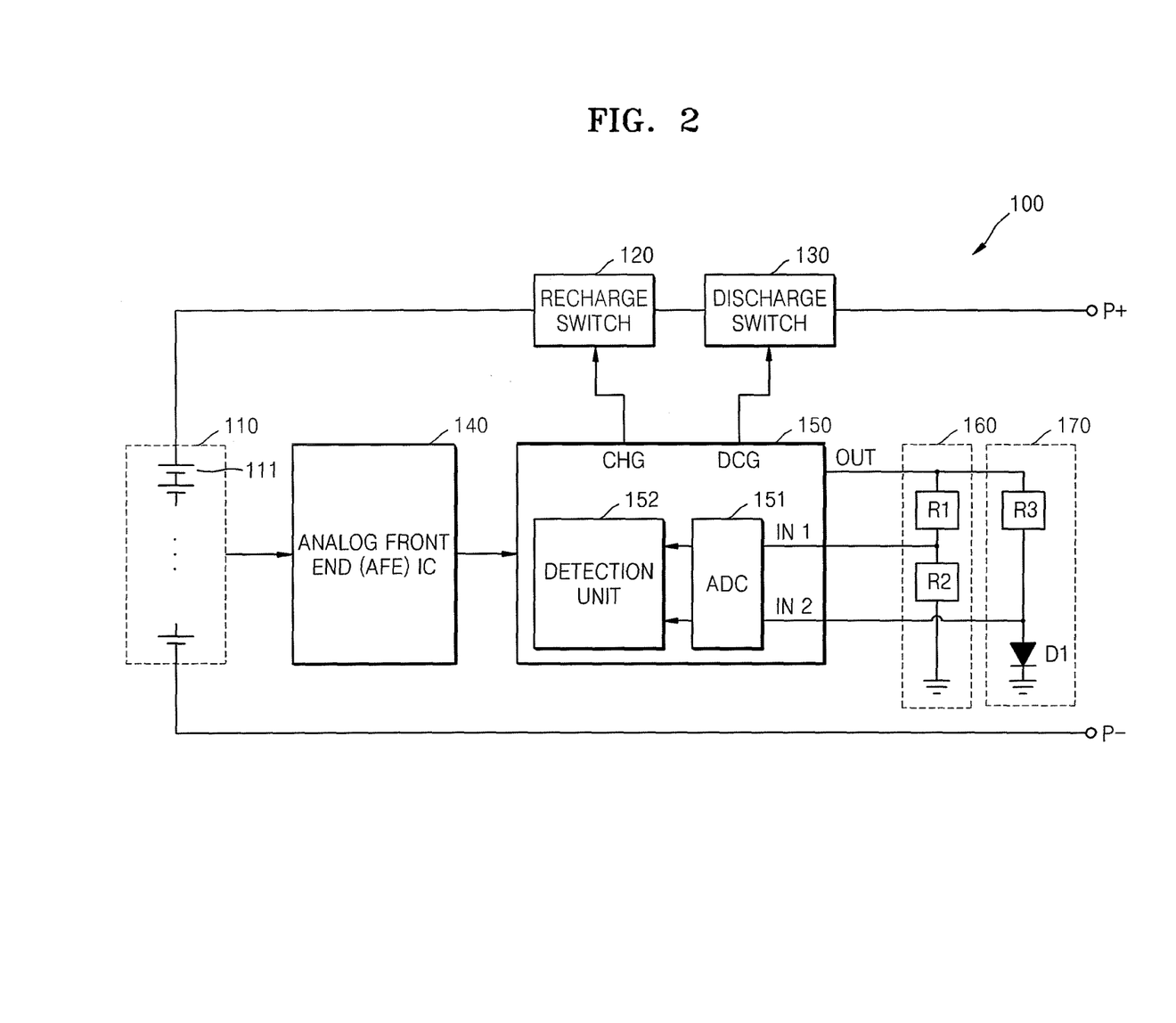
FIG. 2 illustrates a circuit diagram of a battery pack according to an embodiment.

FIG. 1 illustrates a configuration of a battery pack 100 according to an embodiment. FIG. 2 illustrates a circuit diagram of the battery pack 100.

Referring to FIG. 1, the battery pack 100 according to the current embodiment may include a rechargeable battery 110 and a protective circuit. The protective circuit may include a recharge switch 120, a discharge switch 130, an analog front end (AFE) integrated circuit (IC) 140, a microcomputer 150, a voltage distribution unit 160 connected to the microcomputer 150, and a voltage measuring unit 170.

The rechargeable battery 110 supplies stored power to electronic devices on which the battery pack 100 is mounted. Also, when a charger is connected to the battery pack 100, the rechargeable battery 110 may be recharged by external power. The rechargeable battery 110 may include at least one battery cell 111 (FIG. 2), and the battery cell 111 may be a secondary battery that may be recharged and discharged. The battery cell 111 may be a rechargeable secondary battery, e.g., a nickel-cadmium battery, a nickel metal hybrid battery (NiMH), a lithium ion battery, or a lithium polymer battery. The battery cell 111 outputs various information related to the cell, e.g., a cell temperature, a charge voltage of the cell, and an amount of current that flows through the cell to the AFE IC 140.

The recharge switch 120 and the discharge switch 130 are connected to each other in series on a high current path (HCP) between the battery pack 100 and an external terminal, in order to control the flow of a charge current and a discharge current. The recharge switch 120 blocks a recharge current, and the discharge switch 130 blocks a discharge current. The recharge switch 120 and the discharge switch 130 may include field effect transistors (FETs), e.g., each of the recharge switch 120 and the discharge switch 130 may be a FET, and control of each of the recharge switch 120 and the discharge switch 130 may be performed by the microcomputer 150.

The AFE IC 140 is connected in parallel to the recharge switch 120 and the discharge switch 130, and is connected in series between the rechargeable battery 110 and the microcomputer 150. The AFE IC 140 receives from the battery cell 111 information regarding the battery cell 111, e.g., a cell temperature, a charge voltage of the cell, and an amount of current that flows through the cell, and transmits the received information to the microcomputer 150. Also, the AFE IC 140 generates a driving voltage of the microcomputer 150 by using a voltage from the battery cell 111.

The microcomputer 150 is an integrated circuit connected in series between the AFE IC 140 and an external system, and controls the recharge switch 120 and the discharge switch 130 to block an overcharge and over-discharge of the battery cell 111. That is, the microcomputer 150 blocks an overcharge and over-discharge of the battery cell 111 by comparing a voltage received from the battery cell 111 through the AFE IC 140 with a level of voltage set in the microcomputer 150, followed by switching on or off the recharge switch 120 and the discharge switch 130 by a control signal generated according to the comparison result. Here, it is described that the switching control of the recharge switch 120 and the discharge switch 130 is performed by the control of the microcomputer 150. However, the switching operation of the recharge switch 120 and the discharge switch 130 may be controlled by the AFE IC 140 according to the control of the microcomputer 150.

In detail, the microcomputer 150 includes an ADC circuit 151 (FIG. 2) for measuring the voltage of the battery cell 111 received from the battery cell 111 through the AFE IC 140 and a circuit that generates a reference voltage. The microcomputer 150 compares the measured ADC value of the battery cell 111 with the reference voltage, and blocks an overcharge and over-discharge by switching on or off the recharge switch 120 and the discharge switch 130 according to the comparison result. However, when the reference voltage is changed due to malfunction of the microcomputer 150, the microcomputer 150 may incorrectly control the recharge switch 120 and the discharge switch 130, thereby causing the battery pack 100 to be unstable.

Therefore, according to example embodiments, the battery pack 100 may include the voltage distribution unit 160 and the voltage measuring unit 170 outside the microcomputer 150 to detect abnormal reference voltage of the microcomputer 150. Accordingly, the microcomputer 150 may detect an abnormal state of the reference voltage by receiving a voltage distribution result and a diode forwarding direction voltage from the voltage distribution unit 160 and the voltage measuring unit 170, respectively. When an abnormal reference voltage is detected, the microcomputer 150 switches off the recharge switch 120 and the discharge switch 130, thereby preventing or substantially blocking an overcharge and overdischarge of the battery cell 111 in the battery pack 100. Hereinafter, an operation of the microcomputer 150, the voltage distribution unit 160, and the voltage measuring unit 170 are described in detail with reference to FIG. 2.

Referring to FIG. 2, the microcomputer 150 may include a recharge control terminal CHG, a discharge control terminal DCG, a reference voltage output terminal OUT, a first voltage measuring terminal IN_1, and a second voltage measuring terminal IN_2. The reference voltage output terminal OUT outputs an AD reference voltage, e.g., 1.5 V. The first voltage measuring terminal IN_1 receives a distribution voltage of the voltage distribution unit 160 as a first voltage. The second voltage measuring terminal IN_2 receives a diode forwarding direction voltage of the voltage measuring unit 170 as a second voltage.

The voltage distribution unit 160 distributes the reference voltage and is formed between the reference voltage output terminal OUT of the microcomputer 150 and a ground. The voltage distribution unit 160 includes a first resistance R1 and a second resistance R2 between the reference voltage output terminal OUT of the microcomputer 150 and the ground, and outputs an intermediate voltage by the distribution as the first voltage. In detail, an end of the first resistance R1 of the voltage distribution unit 160 is connected to the reference voltage output terminal OUT of the microcomputer 150, and the other end of the first resistance R1 is connected to a node between the first voltage measuring terminal IN_1 and an end of the second resistance R2. An end of the second resistance R2 is connected to a node between the first voltage measuring terminal IN_1 and the other end of the first resistance R1, and the other end of the second resistance R2 is connected to the ground. Here, the second resistance R2 is a device having its resistance value vary according to temperature, e.g., a thermistor with a negative temperature coefficient (NTC) having its resistance value reduced as temperature increases.

A reference voltage output from the reference voltage output terminal OUT of the microcomputer 150 is distributed by the first and second resistances R1 and R2, so voltage input to the first voltage measuring terminal IN_1 of the microcomputer 150 varies according to temperature. For example, when the temperature increases, since the resistance value of the second resistance R2 is reduced, the first voltage input to the first voltage measuring terminal IN_1 of the microcomputer 150 distributed by the first and second resistances R1 and R2 is reduced. However, when the temperature is reduced, since the resistance value of the second resistance R2 increases, the first voltage input to the first voltage measuring terminal IN_1 of the microcomputer 150 distributed by the first and second resistances R1 and R2 is increased. In this manner, a current temperature of the battery cell 111 or the microcomputer 150 may be estimated through a first voltage signal input to the first voltage measuring terminal IN_1.

Also, when a reference voltage output from the microcomputer 150 varies at a constant temperature state, the variation of the first voltage distributed by the voltage distribution unit 160 coincides with the change rate of the reference voltage. That is, when the reference voltage is increased relative to a current voltage at a same temperature condition, the first voltage is increased to a value higher than the current voltage. Similarly, when the reference voltage is reduced relative to a current voltage at a same temperature condition, the first voltage is decreased to a value lower than the current voltage. This is because when the temperature condition is constant, the resistance value of the second resistance R2 is constant.

The voltage measuring unit 170 is formed between the reference voltage output terminal OUT of the microcomputer 150 and the ground. The voltage measuring unit 170 outputs a diode forwarding direction voltage as the second voltage, and includes a third resistance R3 and a diode. An end of the third resistance R3 is connected to the reference voltage output terminal OUT of the microcomputer 150, and the other end is connected to a node between the second voltage measuring terminal IN_2 of the microcomputer 150 and an end of a diode D1. An end of the diode D1 is connected to a node between the second voltage measuring terminal IN_2 of the microcomputer 150 and the other end of the third resistance R3, and the other end of the diode D1 is connected to the ground. Here, a value of the diode forwarding direction voltage Vf of the diode D1 varies according to temperature.

Figure 3:
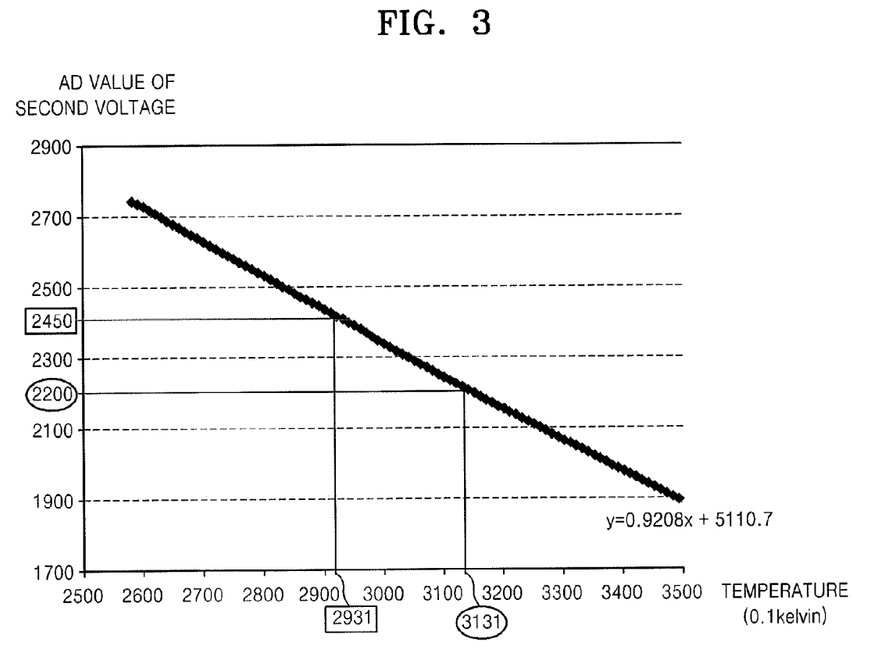
FIG. 3 is a graph illustrating characteristics of a forwarding direction voltage of a diode according to temperature change in FIG. 2.

FIG. 3 illustrates a graph of digital values of the second voltage input to the second voltage measuring terminal IN_2 of the microcomputer 150 according to temperature change. These values coincide with characteristics of the forwarding direction voltage Vf of the diode D1 according to temperature change. Referring to FIG. 3, when a temperature is increased, since the forwarding direction voltage Vf of the diode D1 is decreased, the second voltage input to the second voltage measuring terminal IN_2 of the microcomputer 150 is decreased. However, when the temperature is decreased, since the forwarding direction voltage Vf of the diode D1 is increased, the second voltage input to the second voltage measuring terminal IN_2 of the microcomputer 150 is increased. Also, when a temperature is constant, the forwarding direction voltage Vf of the diode D1 is maintained at a current state.

The microcomputer 150 may include the ADC 151 and a detection unit 152. The ADC 151 converts the first voltage and the second voltage output from the first voltage measuring terminal IN_1 and the second voltage measuring terminal IN_2, respectively, into digital voltage values. The digital values output from the ADC 151 are changed according to a resolution set in advance in the ADC 151.

Here, the resolution denotes a minimum change of an analog input for changing a digital output to one grade. This is the lowest analog value that may be expressed by an ADC. That is, when an ADC is of n bits, a range of a digital output data is 0 to $2^n-1$, so the resolution is a value obtained by dividing a full scale voltage by $2^n$. For example, when a voltage having a full scale of about 0 V to about 1.5 V is converted to a digital value by using an ADC having 10 bits, the resolution may be expressed as $1.5/2^{10}$ V, i.e., about 0.00146 V. Also, when a voltage having a full scale of about 0 V to about 2.0 V is converted to a digital value by using an ADC having 10 bits, the resolution may be expressed as $2.0/2^{10}$ V, i.e., about 0.00195 V. In this way, when the number of bits of the ADC is the same, the resolution is proportional to the full scale range. Also, when the full scale range is constant, the number of bits of the ADC is inversely proportional to the resolution. That is, the ADC 151 outputs digital values by converting the first voltage and the second voltage according to a resolution set in advance. It is noted that "full scale" refers to a maximum voltage value that can be output by an ADC.

The detection unit 152 checks the digital values of the first voltage and the second voltage output from the ADC 151. When a change rate of the second voltage exceeds a critical value, while the first voltage is constant, the detection unit 152 detects an abnormality of the reference voltage. When an abnormality of the reference voltage is detected, the microcomputer 150 switches off the recharge switch 120 and the discharge switch 130 through the recharge control terminal CHG and the discharge control terminal DCG.

Figure 4:
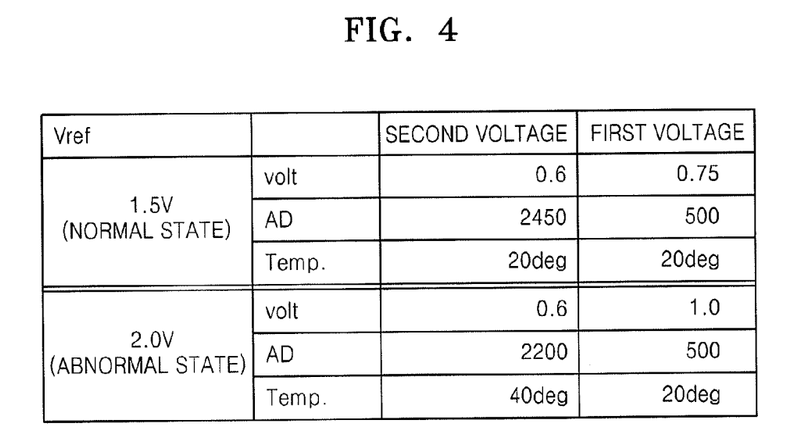
FIG. 4 is a Table summarizing voltages and temperatures of a diode and a thermistor according to the variation of reference voltage of a microcomputer in FIG. 2.

Hereinafter, a method of detecting an abnormality of the reference voltage will now be described in detail with reference to FIG. 4. FIG. 4 summarizes voltages and temperatures of a diode and a thermistor according to the variation of the reference voltage. Referring to FIG. 4, it is assumed that a reference voltage of 1.5 V is output when the microcomputer 150 operates normally, and a reference voltage of 2.0 V is output when the microcomputer 150 operates abnormally.

When the microcomputer 150 operates normally, i.e., when the reference voltage of the microcomputer 150 is 1.5 V, the microcomputer 150 computes a digital value of 500 by converting a first voltage, e.g., 0.75 V, received from the voltage distribution unit 160 through the first voltage measuring terminal IN_1 at the ADC 151. When the digital value of 500 is converted to temperature, the digital value of 500 corresponds to a temperature of 20° C. When the temperature is 20° C., the microcomputer 150 computes a digital value of 2450 by converting a second voltage, e.g., 0.6 V, received from the voltage measuring unit 170 through the second voltage measuring terminal IN_2 at the ADC 151. Referring to FIG. 3, the temperature of 20° C. equals an absolute temperature of 2931K, and the value of the digital second voltage is 2450 at the absolute temperature of 2931K.

However, at an abnormal operation of the microcomputer 150, i.e., when the reference voltage of the microcomputer 150 is 2.0 V, the microcomputer 150 computes a digital value of 500 by converting a first voltage, e.g., 1.0 V, received from the voltage distribution unit 160 through the first voltage measuring terminal IN_1 at the ADC 151. When the digital value of 500 is converted to temperature, the digital value of 500 corresponds to the temperature of 20° C. When the temperature is 20° C., the microcomputer 150 should compute a digital value of 2450 by converting the second voltage, e.g., 0.6 V, received from the voltage measuring unit 170 through the second voltage measuring terminal IN_2 at the ADC 151. However, as depicted in FIG. 4, the microcomputer 150 computes a digital value of 2200, i.e., instead of 2450, by converting the second voltage, e.g., 0.6 V, received from the voltage measuring unit 170 through the second voltage measuring terminal IN_2 at the ADC 151. Referring to FIG. 3, the digital value of 2200 of the second voltage indicates the second voltage when the temperature is 40° C. (absolute temperature of 3131K).

This result, i.e., determining a temperature of 40° C., may lead to two possible conclusions. First, the temperature of the battery cell 111 or of the microcomputer 150 may increase, if the second voltage, i.e., the forwarding direction voltage Vf of the diode D1, is changed. Second, the reference voltage output from the microcomputer 150 may change, if the second voltage, i.e., the forwarding direction voltage Vf of the diode D1, is changed.

However, as depicted in FIG. 4, the temperature is constant at 20° C. At this state, although the reference voltage is changed, the digital value of the first voltage is 500. In this way, in a state that the temperature is constant at 20° C., the digital value of the second voltage should be computed as 2450. However, as the computed digital value of the second voltage is 2200, it is determined that the reference voltage is changed. As described above, this is because the full scale value of the ADC 151 is changed from 0~1.5V to 0~2.0V, and the resolution is changed, thereby changing the digital value of the second voltage. In this way, the microcomputer 150 detects the reference voltage as abnormal when a variation rate of the second voltage exceeds a critical value at a constant temperature condition and at a constant first voltage, and protects the battery pack 100 from overcharging and overdischarging by switching off the recharge switch 120 and the discharge switch 130.

Figure 5:
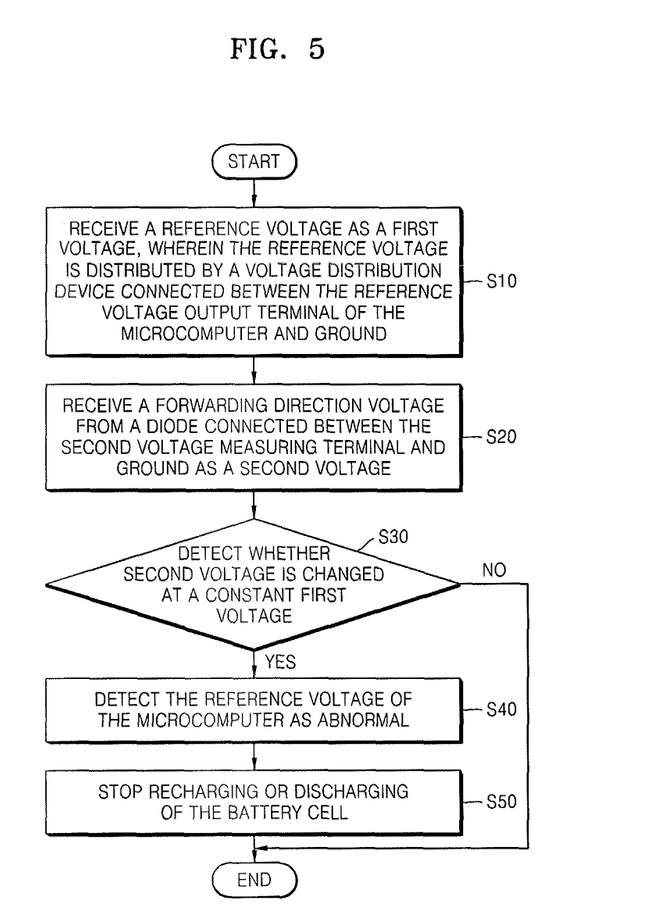
FIG. 5 illustrates a flowchart of a method of controlling a battery pack according to an embodiment.

FIG. 5 illustrates a flowchart of a method of controlling the battery pack 100 according to an embodiment. In the method of controlling the battery pack 100, the control of the battery pack 100 may be performed by the microcomputer 150 and additional peripheral elements as depicted in FIG. 1. In the following explanation, descriptions of elements that overlap with the elements of FIGS. 1 through 4 are not repeated.

Referring to FIG. 5, the microcomputer 150 receives a reference voltage as a first voltage, wherein the reference voltage is distributed by the voltage distribution device 160 that is connected between the reference voltage output terminal OUT and the ground (S10).

The voltage distribution device 160 includes a first resistance R1 and a second resistance R2 which are connected in parallel between the reference voltage output terminal OUT and the ground. Here, the second resistance R2 is a device, a resistance value of which varies according to temperature. For example, the second resistance R2 may be a thermistor having an NTC, i.e., a resistance value that decreases as temperature increases. A reference voltage output form the reference voltage output terminal OUT of the microcomputer 150 is distributed by the first and second resistances R1 and R2, and a voltage input to the first voltage measuring terminal IN_1 of the microcomputer 150 is changed according to temperature.

When receipt of the first voltage is completed, the microcomputer 150 receives a forwarding direction voltage Vf from the diode D1 connected between the reference voltage output terminal OUT and the ground (S20).

The diode D1 is connected in series together with the third resistance R3 between the reference voltage output terminal OUT and the ground. Temperature is in inverse proportion to the forwarding direction voltage Vf from the diode D1. Accordingly, when the temperature of the battery cell 111 or the microcomputer 150 is increased, the forwarding direction voltage Vf of the diode D1 is decreased, and thus, the second voltage input to the second voltage measuring terminal IN_2 of the microcomputer 150 is decreased. However, when the temperature of the battery cell 111 or the microcomputer 150 is decreased, the forwarding direction voltage Vf of the diode D1 is increased, and thus, the second voltage input to the second voltage measuring terminal IN_2 of the microcomputer 150 is increased. Also, when the temperature is constant, the forwarding direction voltage Vf of the diode D1 is maintained at a current state.

Afterwards, the microcomputer 150 determines whether the second voltage is changed or not when the first voltage is maintained at a constant value (S30). When the second voltage is changed at a constant value of the first voltage, the microcomputer 150 detects, i.e., determines, that the reference voltage is abnormal (S40).

After the microcomputer 150 receives the first and second voltages, the ADC 151, in which a resolution is set in advance, converts the first and second voltages to digital values. From the constant state of the digital value that is converted from the first voltage, the microcomputer 150 may determine the temperature state of the battery cell 111 or the microcomputer 150 as constant. That is, when a reference voltage output from the microcomputer 150 is changed at a constant temperature condition, the first voltage distributed by the voltage distribution device 160 coincides with the change rate of the reference voltage. Furthermore, when the second voltage converted to a digital value is changed at a constant state of the first voltage that is converted to a digital value, the microcomputer 150 detects the reference voltage as abnormal. This is because the full scale value of the ADC 151 is changed due to the change of the reference voltage, and accordingly, the resolution is changed. As a result, the digital value of the second voltage is changed due to the change of the resolution.

In this way, when the microcomputer 150 detects that the reference voltage is abnormal due to the change of the second voltage at a constant state of the first voltage, the microcomputer 150 stops recharging or discharging the battery cell 111 to protect the battery pack 100.

According to example embodiments, the battery pack may be protected when there is a safety and functional problem of the battery pack by stopping recharging and discharging a battery cell by detecting an abnormality of a reference voltage of the microcomputer. That is, the battery pack may include a voltage distribution unit and a voltage measuring unit outside the microcomputer to detect abnormal reference voltage of the microcomputer.

While example embodiments have been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A battery pack, comprising:
    at least one battery cell;
    a microcomputer including a first voltage measuring terminal, a second voltage measuring terminal, and a reference voltage output terminal outputting a reference voltage generated by the microcomputer, the microcomputer to control recharge and discharge of the at least one battery cell;
    a voltage distribution unit connected between the reference voltage output terminal and a ground, the voltage distribution unit to divide the reference voltage and to output the divided reference voltage to the first voltage measuring terminal of the microcomputer as a first voltage; and
    a voltage measuring unit connected between the reference voltage output terminal and the ground, the voltage measuring unit to output a forwarding direction voltage of a diode to the second voltage measuring terminal of the microcomputer as a second voltage, wherein
    the microcomputer receives the first and second voltages through the first and second voltage measuring terminals, respectively, and detects whether the reference voltage is an abnormal voltage or not based on the first and second voltages, wherein
    the voltage distribution unit and the voltage measuring unit receive the reference voltage from the microcomputer, and generate the first and second voltages, respectively, by using the reference voltage.

2. The battery pack as claimed in claim 1, wherein the microcomputer is to determine the reference voltage as the abnormal voltage, when a variation rate of the second voltage is greater by a predetermined value than a variation rate of the first voltage.

3. The battery pack as claimed in claim 2, wherein the microcomputer is to stop recharging or discharging the battery cell when the reference voltage is detected as the abnormal voltage.

4. The battery pack as claimed in claim 1, wherein the microcomputer further comprises:
    an analog-to-digital converter (ADC) to convert voltage values of the first and second voltages to digital values according to a resolution set in advance; and
    a detection unit to determine whether the reference voltage is abnormal or not according to the converted digital values of the first voltage and the second voltage.

5. The battery pack as claimed in claim 4, wherein a resolution of the ADC is determined according to voltage difference between the reference voltage and the ground.

6. The battery pack as claimed in claim 1, wherein the voltage distribution unit includes:
    a first device having first and second ends, the first end of the first device being connected to the reference voltage output terminal; and
    a second device having first and second ends, the first end of the second device being connected to a node between the second end of the first device and the first voltage measuring terminal, and the second end of the second device being connected to the ground.

7. The battery pack as claimed in claim 6, wherein the first device or the second device is a temperature sensitive resistor.

8. The battery pack as claimed in claim 7, wherein the first device or the second device is a thermistor.

9. The battery pack as claimed in claim 6, wherein the voltage measuring unit includes:
    a third device having first and second ends, the first end of the third device being connected to the reference voltage output terminal; and
    a diode having first and second ends, a first end of the diode being connected to a node between the second end of the third device and the second voltage measuring terminal, and the second end of the diode being connected to the ground.

10. The battery pack as claimed in claim 1, wherein:
    the reference voltage has a predetermined voltage level, and
    voltage levels of the first and second voltages are changed according to temperature.

11. A method of controlling a battery pack having at least one battery cell and a microcomputer with a reference voltage output terminal outputting a reference voltage generated by the microcomputer, a first voltage measuring terminal, and a second voltage measuring terminal, the method comprising:
    dividing the reference voltage by a voltage distribution unit, such that the divided reference voltage is received by the microcomputer as a first voltage through the first voltage measuring terminal, the voltage distribution unit being connected between the reference voltage output terminal and a ground;
    receiving from a voltage measuring unit a forwarding direction voltage of a diode as a second voltage through the second voltage measuring terminal of the microcomputer, the voltage measuring unit being connected between the reference voltage output terminal and the ground;
    detecting whether the reference voltage is an abnormal voltage or not based on the first and second voltages at respective first and second voltage measuring terminals; and controlling recharge and discharge of the at least one battery cell according to whether the reference voltage is the abnormal voltage or not, wherein the voltage distribution unit and the voltage measuring unit receive the reference voltage from the microcomputer, and generate the first and second voltages, respectively, by using the reference voltage.

12. The method as claimed in claim 11, wherein detecting whether the reference voltage is the abnormal voltage or not includes detecting the reference voltage as the abnormal voltage when a variation rate of the second voltage is greater by a predetermined value than a variation rate of the first voltage.

13. The method as claimed in claim 12, further comprising stopping recharging or discharging the at least one battery cell when the reference voltage is detected as the abnormal voltage.

14. The method as claimed in claim 11, wherein receiving the first voltage includes temperature information of the battery cell or the microcomputer by using, wherein the temperature information of the battery cell or the microcomputer is generated by a predetermined device, the predetermined device having a resistance that varies according to temperature.

15. The method as claimed in claim 11, wherein receiving the second voltage includes receiving the forwarding direction voltage of the diode in the voltage measuring unit as the second voltage, the forwarding direction voltage of the diode varying according to temperature.

* * * * *